May 7, 1963  I. BONIC  3,088,230
DEVICE FOR CLEARING SNOW FROM THE PATH OF AN AUTOMOBILE WHEEL
Filed Sept. 7, 1960  2 Sheets-Sheet 1
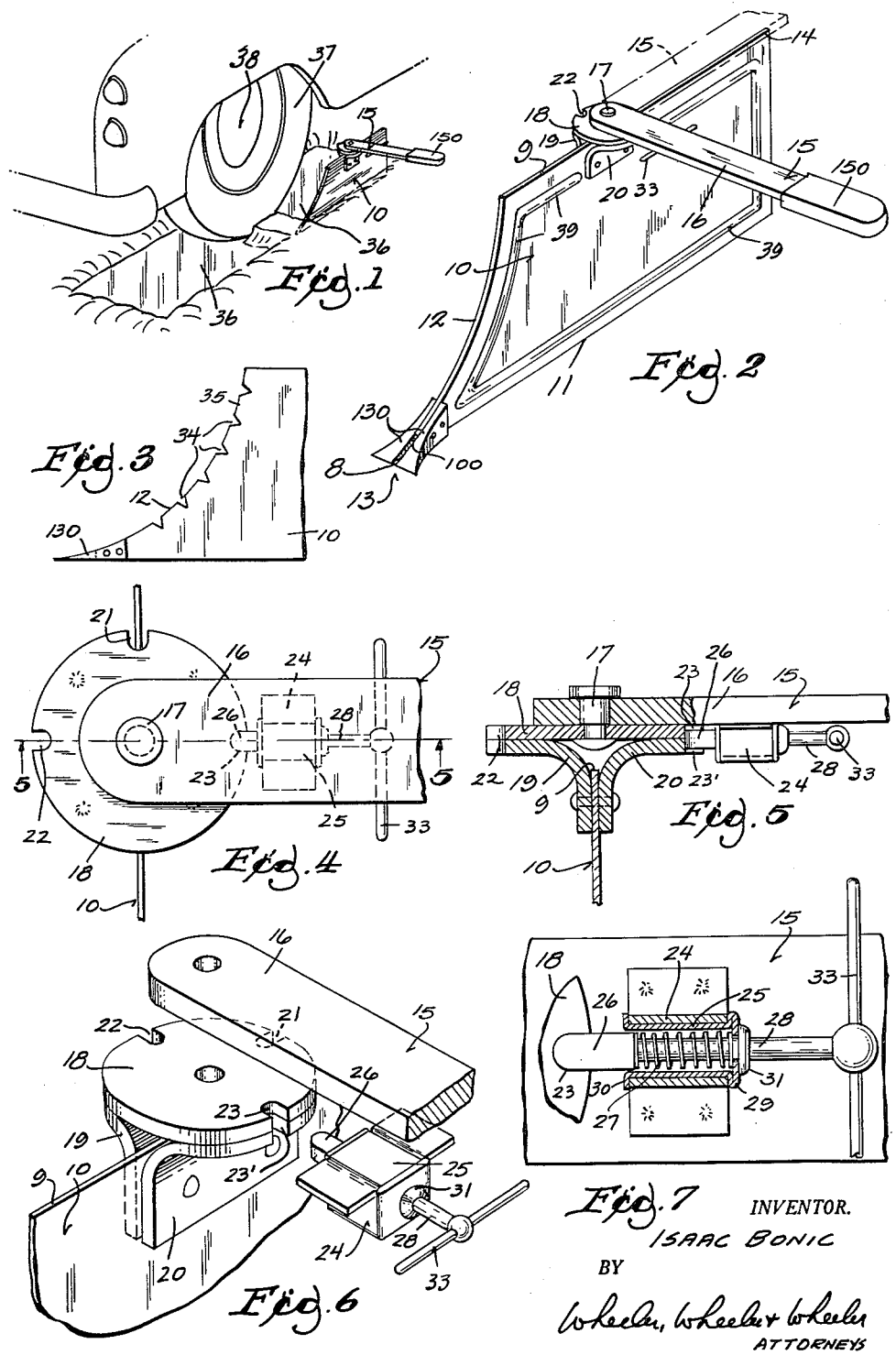
INVENTOR.
ISAAC BONIC
BY
Wheeler, Wheeler & Wheeler
ATTORNEYS

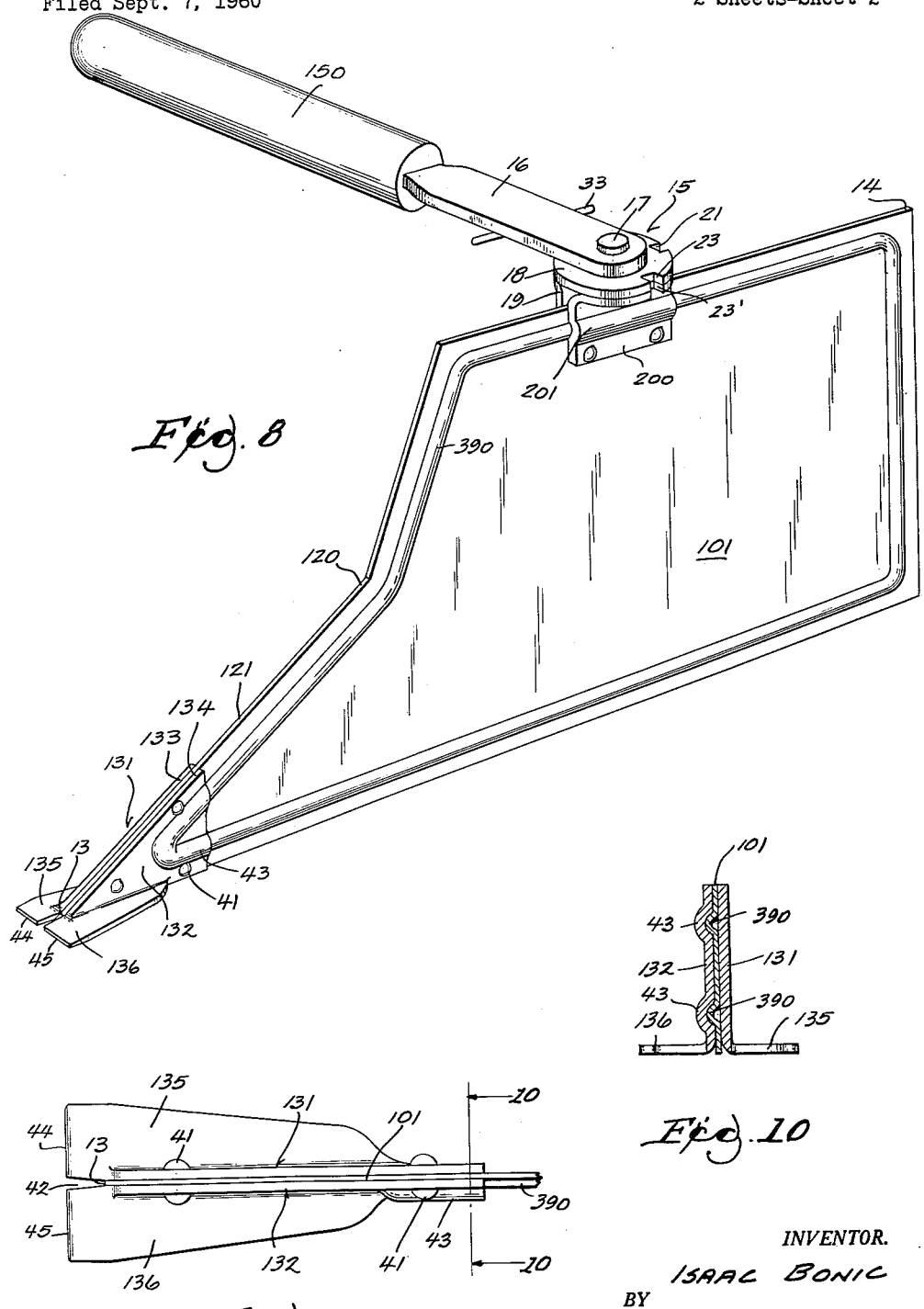

United States Patent Office 3,088,230
Patented May 7, 1963

3,088,230
DEVICE FOR CLEARING SNOW FROM THE PATH OF AN AUTOMOBILE WHEEL
Isaac Bonic, 3000 N. 54th St., Milwaukee, Wis.
Filed Sept. 7, 1960, Ser. No. 54,519
9 Claims. (Cl. 37—53)

This invention relates to a device for clearing snow from the path of an automobile wheel.

Cross reference is made to my copending application 479,791, filed January 4, 1955 now Patent No. 2,958,143, and application 39,965 filed June 30, 1960, of which this application is a continuation in part.

Even an inch or two of snow or slush may obstruct a vehicle wheel sufficiently to prelude starting the vehicle, whereas, if the vehicle wheel has a free path which is even a couple of feet in length, it will be able to surmount much deeper snow with ease and to maintain vehicle motion. Accordingly, the present invention contemplates provision of a scraper which has an upper margin concave in the sense of being adapted to receive a tire casing, and a substantially straight lower margin to which the upper margin extends at a relatively sharp apex. The other upper corner is desirably left square for maximum snow displacement. Moreover, the apex is very sharp, since most tire casings are slightly flattened when they engage the pavement. Thus I permit the scraper to operate under the curve of the pneumatic casing sufficiently far to displace any accumulations of snow, slush or even ice which would impede wheel rotation. For facilitating action on frozen or semi-frozen material, the blade may have a chisel point. Preferably prefabricated shoes are applied to the blade and interlocked therewith to provide the chisel point and facilitate manipulation of the tool beneath the tire casing.

In the drawings:

FIG. 1 is a view in perspective showing the manner of use of a scraper embodying the invention.

FIG. 2 shows the scraper in perspective on an enlarged scale.

FIG. 3 is a fragmentary side elevational view of a modified scraper blade.

FIG. 4 is a fragmentary detail view in plan showing on an enlarged scale the pivotally adjustable handle and its connection to the top of the blade.

FIG. 5 is a detail view taken in section on the line 5—5 of FIG. 4.

FIG. 6 is a fragmentary detail view showing relatively separated component parts of the handle and its mounting.

FIG. 7 is a detail view showing the manually retractable handle positioning dog portions of the fitting in which it is reciprocable, and the spring which biases the dog, being shown in section.

FIG. 8 is a view on an enlaregd scale showing in perspective a modified embodiment of the invention.

FIG. 9 is a fragmentary detail view in plan showing on a further enlarged scale the tip portion of the tool.

FIG. 10 is a detail view taken in section on line 10—10 of FIG. 9.

A scraper embodying my invention comprises a blade 10 having a substantially straight lower edge 11 to which the top edge 9 is preferably parallel. At its front end, the blade has a concave forward margin 12 convergent to a sharp apex at 13. Preferably, the apex 13 is provided by at least one and preferably two chisel shoes 130, the upper surfaces of which are extensions of the curved margin 12 and the lower surfaces of which are extensions of the horizontal lower margin 11 of the blade. Between the chisel blocks 130, the blade may be blunted or cut away at 100 leaving an open slot 8 between the chisel shaped apices 13 provided by the blocks 130.

The upper corner 14 is preferably left square.

The handle 15 comprises a shank portion 16 pivotally connected with the blade 10 along the top margin 9 thereof in a manner hereinafter described. The shank portion 16 of the handle desirably carries a grip portion 150. Means is provided for locking the pivoted handle in at least two positions and preferably three or more. The preferred positions include a position of alignment with the blade 10 and positions in which the handle projects at right angles to the blade in either lateral direction.

The shank portion 16 of handle 15 may conveniently be pivoted upon a pintle rivet 17 welded to the disc 18, which is welded to the curved bracket plates 19 and 20, these being riveted or otherwise secured in clamping engagement with intervening blade 10 as shown in FIG. 5. The form of the bracket elements 19 and 20 is desirably such as to carry the rivet 17 above the top margin 9 of blade 10 so that the handle may swing freely about the pintle. The disc 18 may be provided with peripheral notches at 21, 22 and 23 to define the preferred handle positions. Where the notched margins of the disc 18 overlie the bracket members 19 and 20, the notches may optionally extend into the bracket members as indicated at 23' in FIG. 6.

Fastened by a strap 24 to the underside of the handle shank 16 is a housing 25 for a reciprocable dog 26. The dog may have a rounded end to fit into a selected notch, 21, 22 or 23. It is biased toward the disc 18 by a compression spring 27 encircling its handle portion 28. The end of the housing is desirably flanged at 29 and 30 to engage the strap 24, whereby to be positioned by the strap against displacement in the direction of dog reciprocation. A stop member 31 engages the end of housing 25 to limit the spring biased advancing movement of the dog 26. The handle 28 is provided with a manually engageable crosspin 33 to facilitate retraction of the dog from the selected notch when it is desirable to move the handle to a different angular position with respect to the blade 10.

The handle may be aligned with blade 10 as shown in dotted lines in FIG. 2, both for storage of the tool and for use in an operation in which the handle is employed to thrust the chisel toothed forward end of the blade endwise against ice or some other obstruction which it is desired to dislodge. For scraping the snow aside in the manner shown in FIG. 1, the dog with which the handle is provided will be engaged either with notch 22 or 23 to position the handle rigidly at right angles to the blade, the direction of lateral projection depending on the side of the vehicle at which the operator desires to work.

As shown in FIG. 3, it is sometimes desirable that the curved margin 12 of the blade be provided with spaced notches 34 to form teeth 35. Under certain circumstances, these teeth will facilitate removal of ice from the periphery of a wheel or tire such as the casing 37 of vehicle wheel 38 shown in FIG. 1.

The handle permits the blade to be manipulated beneath the tread of the tire casing 37 to scrape away the snow along a path indicated at 36. The blade may be reinforced, if desired, by the provision of any appropriate ribs such as those shown at 39 in FIG. 2. Despite these ribs the blade is substantially flat or planiform, its edge 12 lying substantially in one plane. This is important when the blade is being manipulated edgewise, since a curved blade could not be guided in a straight line.

In case there is ice as well as snow depriving the vehicle wheel of traction, the chisel block attachments 130 will be of material assistance in dislodging the ice from underneath the casing.

FIG. 8 shows a number of modifications which happen to be included in a single embodiment of the invention but may be used independently if desired. The blade 101 is essentially like the blade 10 except that its forward margin 120 is angularly rather than arcuately concave to extend around a tire casing. Also bead 390 is continuous beneath the bracket element 200, such element having a complementary channeled form at 201 to receive the bead 390 and to provide interlocking connection therewith.

The prefabricated shoes 131, 132 are not cast, as are the shoes 130 in FIG. 2 but are made of complementary stampings fitted at their upper margins 133, 134 to the margin 121 of the blade 101, and anchored at opposite sides of said blade as by rivets 41. Each of the shoes desirably has a flange turned outwardly, the respective flanges being designated by reference characters 135, 136. Desirably these flanges are slightly spaced at 42 where they project beyond the apex 13 of the blade.

At least the shoe 132 is desirably provided with a channel 43 registering with the channel 390 of the scraper blade 101 to interlock the shoe to the blade and to further reinforce the blade as shown in FIGS. 8, 9 and 10.

Desirably, though not necessarily, the forward margins 44, 45 of the shoes 135, 136 are bevelled to a chisel edge (which may be more or less blunt). They are very effective in cutting away ice from beneath a tire casing. The handle and usage of the embodiment shown in FIGS. 8, 9 and 10 are substantially as previously described. It is desired to observe, however, that the substitution of the angular margin 120 for the curvilinear margin 12 is a feature independently usable in the previously described embodiment, as is the substitution of the stamped shoes 131, 132 for the cast shoe of the original embodiment. The matter of having the bead of the blade engaged by the shoes and/or the handle bracket is also an independently usable feature.

I claim:

1. A tool for scraping and chopping snow and the like from the path of the wheel of a parked vehicle, said tool comprising a substantially planiform blade having a pavement-contacting lower margin and having at least one of its end margins with an intermediate offset to receive the periphery of the wheel and converging at a sharp tool apex toward said lower margin, whereby said blade is operable to remove substantially all material from the path of the wheel, the blade being provided with a handle for its manipulation, said tool apex being provided with a shoe of complementary form whereby to increase the width and mass of the apex.

2. A tool for scraping and chopping snow and the like from the path of the wheel of a parked vehicle, said tool comprising a substantially planiform blade having a pavement-contacting lower margin and having at least one of its end margins with an intermediate offset to receive the periphery of the wheel and converging at a sharp tool apex toward said lower margin, whereby said blade is operable to remove substantially all material from the path of the wheel, the blade being provided with a handle for its manipulation, the tool apex having a pair of shoes of complementary form attached to opposite sides of the blade and having aligned apices together forming a chisel edge of substantial width, the blade having its said apex between said shoes and beyond which the apices of the shoes project, whereby the shoes are spaced at their apices.

3. The device of claim 2 in which the respective shoes are prefabricated stampings having portions for engaging opposite faces of the blade and flange portions projecting laterally to provide said chisel edge.

4. The device of claim 2 in which the blade has a reinforcing rib spaced inwardly from its margin, at least one of said shoes having a complementary channel interlocked with said rib.

5. The device of claim 2 in which the respective shoes comprise prefabricated stampings between which the blade is sandwiched, connecting means extending through the blade for connecting the shoes to each other and to the blade, the said shoes having oppositely projecting lateral flanges substantially flush with the bottom of the blade and together providing a wide forward margin across said apex.

6. The device of claim 4 in which the blade is provided along its said one end margin and its lower margin with a reinforcing rib coming to an apex rearwardly of the sharp tool apex, at least one of said prefabricated shoes having a channel complementary to said rib at the said apex of said rib and interlocked therewith.

7. A scraping tool for clearing snow and ice from the path of a vehicle, said tool comprising a blade having forward and lower margins convergent to an apex with which the tool is provided substantially at the level of its lower margin, said blade having at its upper margin bracket means applied to its respective faces, a horizontal plate carried by the bracket means and disposed transversely across the upper margin of the blade and connected with the bracket means at both sides of the blade, a handle, an upright pintle upon said plate on which the handle is mounted in pivotal connection with the plate for movement between a first position of substantial alignment with the blade and a second position substantially at right angles thereto, and retractable dog means for locking the handle selectively to the plate in each of said positions for use in the manipulation of the blade, the handle being provided with cylinder means in which the dog is reciprocable, the dog being provided with a spring biasing the dog toward said plate and the plate and bracket means having shoulder means with both of which the dog is engaged to resist pivotal movement of the handle respecting the blade.

8. The combination with a scraper blade having an upper margin and also having a lower margin with a chisel point at one end, of a pair of bracket elements connected with the blade and extending upwardly and outwardly at opposite sides of said upper margin; a mounting plate spanning the upper margin and mounted on said bracket elements, a pintle carried by said plate between the bracket elements, a handle through which the said pintle extends, whereby the handle is pivoted for movement over said plate between positions in alignment with and at right angles to said blade, a dog mounted on the handle, a spring biasing the dog toward the plate, the plate having notches selectively engaged by the dog to fix said respective handle positions and means for retracting the dog against the bias of said spring, the said bracket elements providing clearance beneath said plate for said pintle and also providing clearance for the movement of said dog with said handle over the upper margin of said blade.

9. The device of claim 8 in which said blade has lower and forward margins converging to a forward apex with which said blade is provided, said apex comprising chisel teeth attached to opposite sides of the blade and having transversely aligned chisel edges.

References Cited in the file of this patent

UNITED STATES PATENTS

| 184,690 | Baker | Nov. 28, 1876 |
| 405,407 | Goldman | June 18, 1889 |
| 1,255,428 | Kennedy | Feb. 5, 1918 |
| 2,163,979 | Judson | June 27, 1939 |
| 2,799,952 | Weingand | July 23, 1957 |
| 2,932,537 | Wolfe | Apr. 12, 1960 |
| 2,958,143 | Bonic | Nov. 1, 1960 |

FOREIGN PATENTS

| 14,145 | Denmark | Jan. 30, 1911 |